No. 784,562. Patented March 14, 1905.

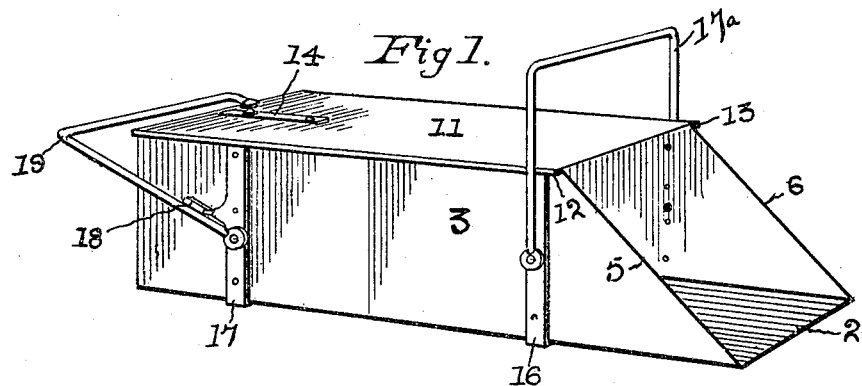
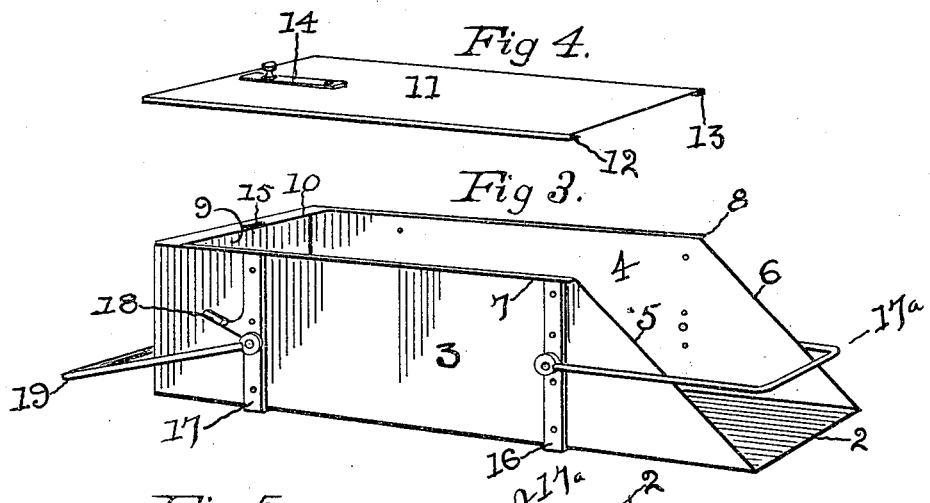
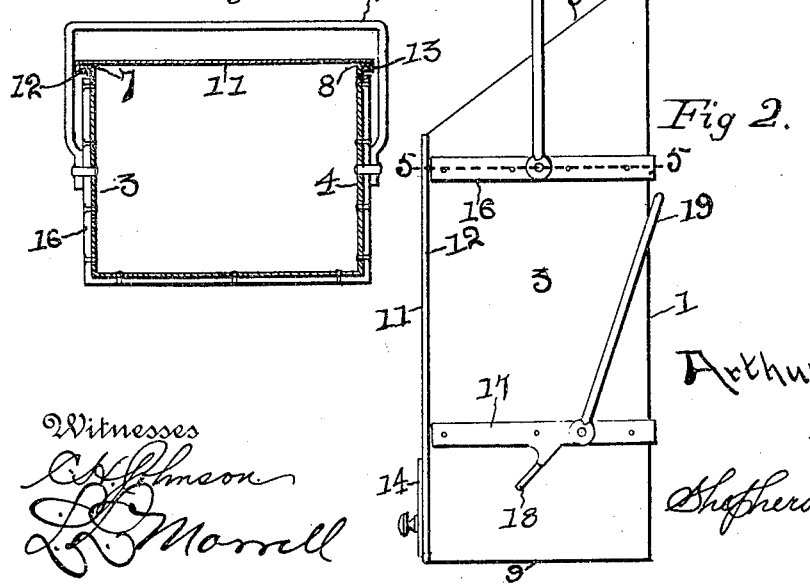

UNITED STATES PATENT OFFICE.

ARTHUR HETLAND, OF HENNING, MINNESOTA, ASSIGNOR OF ONE-THIRD TO OTTO J. OAK, OF HENNING, MINNESOTA.

SCOOP.

SPECIFICATION forming part of Letters Patent No. 784,562, dated March 14, 1905.

Application filed July 11, 1904. Serial No. 216,100.

*To all whom it may concern:*

Be it known that I, ARTHUR HETLAND, a citizen of the United States, residing at Henning, in the county of Ottertail and State of Minnesota, have invented certain new and useful Improvements in Scoops; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to grain-scoops, and has for its object to provide a scoop so arranged as to be conveniently operated for scooping grain and for carrying the contents of the scoop from place to place when desired.

It is well known that a scoop of the variety mentioned if made with a closed top becomes under certain circumstances undesirable for use as a scoop. It is also well known that an open scoop is of no use when it is desired to carry the contents of the same.

The principal object of my invention is to provide a scoop with a removable top to adapt it for use without the top as an open scoop and with the top in place as a closed scoop and as a pail for carrying grain or other contents.

A further object of my invention is to provide a rear bail adapted for use in operating the scoop and to be folded to embrace the body portion to adapt the scoop for use as a pail.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view of my improved grain-scoop shown with the removable top thereon and in position for use as a closed scoop. Fig. 2 is a side elevation showing the rear bail folded about the body portion and the scoop and front bail disposed in position for convenient use as a pail. Fig. 3 is a perspective view of the scoop with the top removed and adapted for use as an open scoop. Fig. 4 is a perspective view of the removable top. Fig. 5 is a transverse sectional view taken on line 5 5 of Fig. 2 and showing in detail the flanges used for securing the removable top upon the scoop-body.

Like characters of reference designate corresponding parts throughout the several views.

In its preferred form my improved scoop consists of a sheet-metal receptacle with plain sides and exhibiting in cross-section a rectangular form. The bottom 1 is provided at its forward end with a scooping edge 2. The sides 3 and 4 are slanted backwardly at 5 and 6 from the scooping edge 2, so that the top of the scoop is shorter than the bottom. The sides 3 and 4 are provided along their longitudinal upper edges with external flanges 7 and 8, disposed substantially at right angles to the plane of the sides 3 and 4. The end of the body portion opposite the scooping edge is provided with an end piece 9, entirely closing such end. The end piece 9 is provided with an inwardly-disposed flange 10. A removable cover 11 is provided with lips 12 and 13, adapted to engage flanges 7 and 8 and is of a length sufficient to cover the top of the scoop. The top member 11 is also provided with a catch adapted to engage an opening 15 in flange 10 to retain the top member 11 in position. About the body portion and near the front end thereof is secured a strengthening-brace 16, with parallel portions thereof secured upon the external faces of the sides 3 and 4. To the brace 16 is pivotally secured a bail 17ª, adapted to be swung upwardly above the top of the scoop-body, as shown in Fig. 1, to serve as a handle for the operation of the scoop or to be swung outwardly over the open end, as shown in Fig. 2, to serve as a bail.

Near the rearward end of the scoop-body is secured a strengthening-brace 17, with parallel portions secured to the external faces of the sides 3 and 4. Secured to brace 17 or integral therewith are lugs 18.

Pivotally secured to brace 17 is a bail 19, adapted to engage lugs 18 when the bail extends rearwardly from the scoop to adapt the bail to be used as a handle for the operation of the scoop, as shown at Fig. 1. The bail 19 is also adapted to be folded to embrace the body portions, as shown in Fig. 2, so as to be out of the way while the scoop is being used as a pail.

While I have described and shown the sides and top of my scoop as plain, it is obvious that they may be constructed circular in form. It is further obvious that different means of retaining the bail 19 in the desired position might be substituted for the lugs 18. It is also obvious that a catch different from the one shown might be used to retain the top in position. It is further obvious that the braces 16 and 17 (shown as extending across the bottom and up each side) might be made with side pieces only, secured to the sides of the scoop and not extending across the bottom, and that other minor changes in construction might be made without departing from the spirit of my invention.

Having thus described my invention, what I claim as novel, and desire to secure by Letters Patent, is—

1. A hollow receptacle having an open end, a plain side, a straight scooping edge, a removable cover disposed opposite the plain side, a pivoted bail secured adjacent to the open end, a pivoted bail secured to the end opposite the scooping edge and adapted to be folded to embrace the body and means for holding the last-mentioned bail at a predetermined operative angle to the receptacle.

2. A grain-scoop consisting of a hollow elongated body portion having an open end, a plain side and straight scooping edge and provided with a sliding cover member removably disposed opposite the plain side, a pivoted bail secured at the front end adapted to serve as a handle for operating the scoop and as a bail for carrying, and a pivoted bail secured to the rear end adapted to engage with lugs to serve as a handle for operating the scoop and to be folded to embrace the body of the scoop for convenience in carrying.

3. A grain-scoop consisting of an elongated hollow body portion rectangular in cross-section, the top adapted to be slidably removed, a spring-catch mounted upon the top adapted to engage the body portion to retain the top in position; one end of the body portion being provided with an end piece closing the opening, the other end provided with slanting sides and a straight scooping edge, strengthening-braces secured to the external sides and near the ends, a bail pivoted to the front brace adapted to swing above the body to serve as a handle for operating the scoop and outwardly over the open end to serve as a pail for carrying, lugs secured to the rear braces and a bail pivoted to the rear braces adjacent to and adapted to contact with the lugs when extending rearwardly of the body in position to serve as a handle for operating the scoop and to be folded to embrace the scoop for convenience in carrying.

In testimony whereof I affix my signature in presence of two witnesses.

ARTHUR HETLAND.

Witnesses:
P. P. PATTERSON,
I. K. NIMS.